United States Patent [19]
Van Gelder

[11] 3,972,180
[45] Aug. 3, 1976

[54] HIGH PRESSURE REACTOR WITH TURBO EXPANDER

[75] Inventor: Louis Ralph Van Gelder, Western Springs, Ill.

[73] Assignee: Chicago Bridge & Iron Company, Oak Brook, Ill.

[22] Filed: Sept. 21, 1971

[21] Appl. No.: 182,377

[52] U.S. Cl. ............... 60/39.05; 60/39.55; 60/39.69; 122/2; 210/152; 423/207
[51] Int. Cl.² ................ F02C 3/24; F22B 1/22
[58] Field of Search ............ 122/2, 4 D; 60/39.02, 60/39.05, 39.55, 39.69; 263/42, 43, 45, 21 A; 210/71, 152; 423/207

[56] References Cited
UNITED STATES PATENTS

| | | | |
|---|---|---|---|
| 2,665,249 | 1/1954 | Zimmerman | 60/39.05 |
| 2,677,234 | 5/1954 | Second | 60/39.02 |
| 2,718,754 | 9/1955 | Lewis et al. | 60/39.02 |
| 2,774,661 | 12/1956 | White | 263/21 A |
| 2,853,455 | 9/1958 | Campbell et al. | 122/4 D |
| 2,976,853 | 3/1961 | Hunter et al. | 122/4 D |
| 3,277,582 | 10/1966 | Munro et al. | 263/21 A |
| 3,309,262 | 3/1967 | Copeland et al. | 423/207 X |
| 3,515,381 | 6/1970 | Foch | 263/21 A |
| 3,549,011 | 12/1970 | Marsh | 210/71 |
| 3,661,558 | 5/1972 | Heath et al. | 263/21 A |

OTHER PUBLICATIONS

"The Zimmerman Process", Sterling Drug Inc., N.Y., 1958, pp.3–12.
"New Waste Disposal Process", Chemical Engineering, 1958 pp. 117–120.

*Primary Examiner*—Carlton R. Croyle
*Assistant Examiner*—Robert E. Garrett
*Attorney, Agent, or Firm*—Merriam, Marshall, Shapiro & Klose

[57] ABSTRACT

Exhaust gases from a high pressure, high temperature fluidized bed reactor are fed through a turbo expander, in order to drive said turbo expander which is connected to a device such as a generator, adapted to accomplish useful work. Preferably, the exhaust gases pass through a particulate removal means prior to passing through the turbo expander.

13 Claims, 2 Drawing Figures

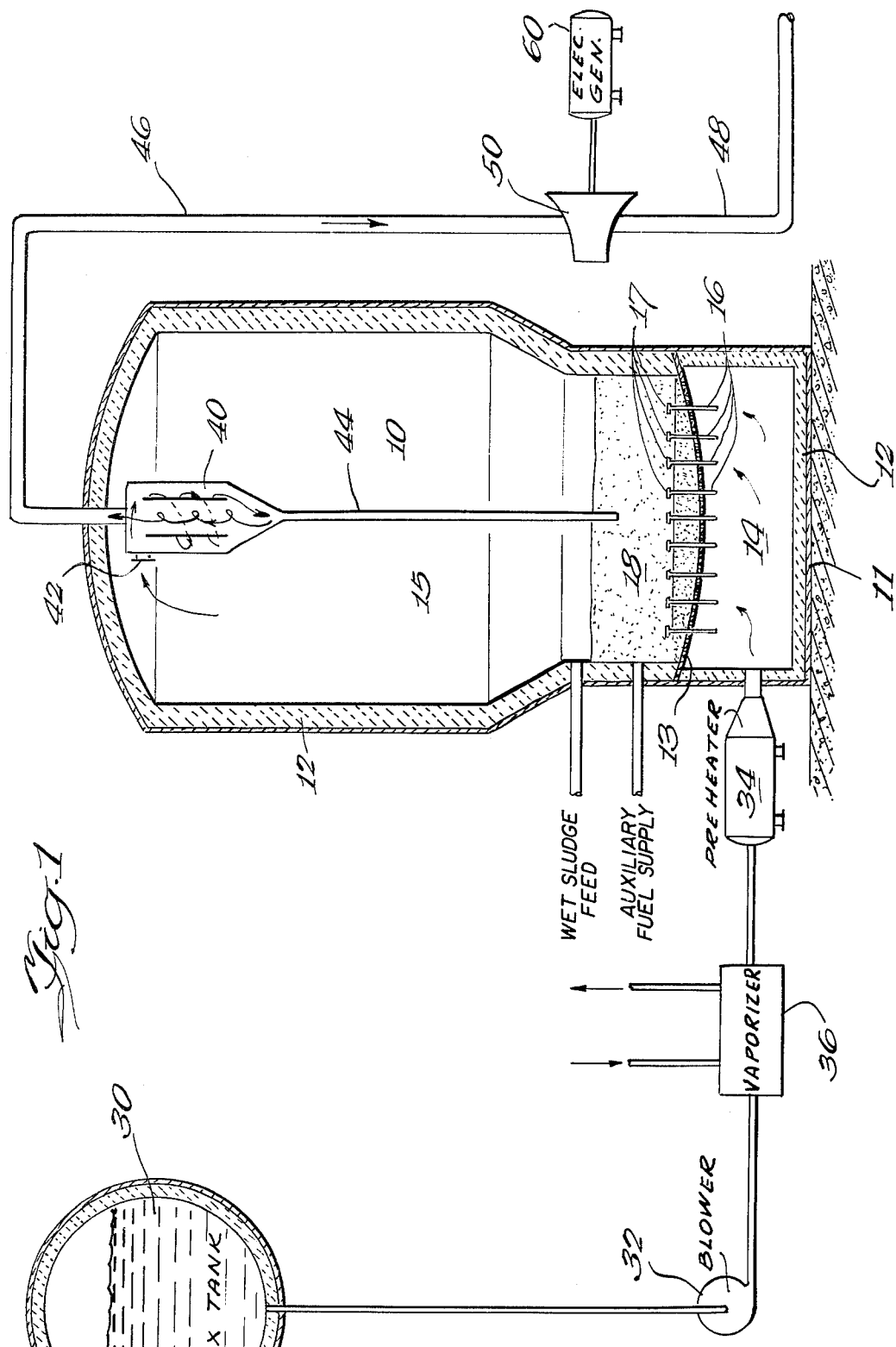

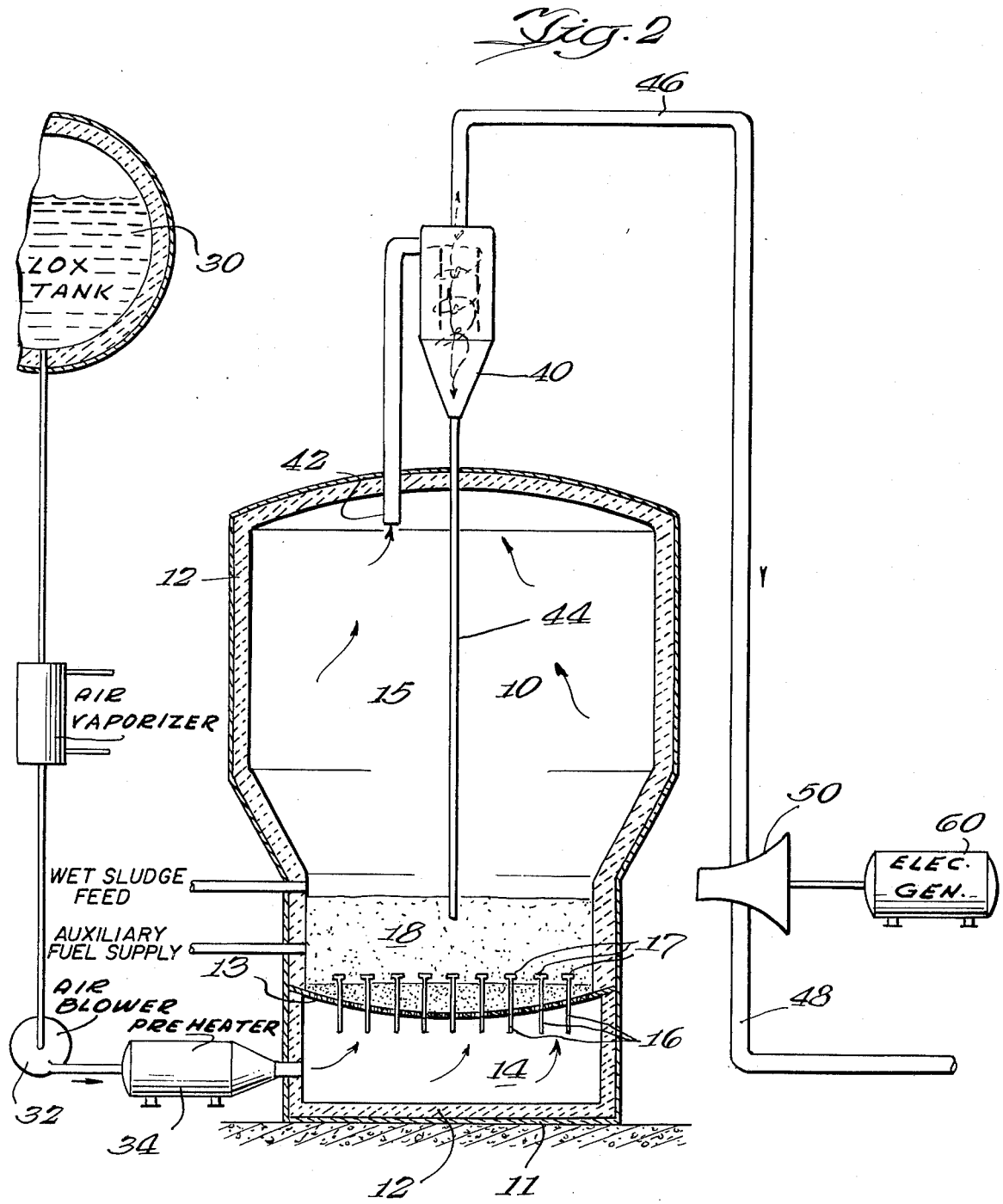

HIGH PRESSURE REACTOR WITH TURBO EXPANDER

The present invention relates to an improved apparatus for and method of carrying out high temperature fluidized bed reactions, such as the incineration of wet sludge or the catalytic cracking of petroleum fractions, and more particularly to a fluidized bed apparatus which operates at high pressures and employs the high pressure exhaust gases to produce useful work. The invention is particularly concerned with the disposal of high-moisture, wet wastes such as municipal wet sludges, which have waste solids comprising a major portion of combustible organic waste matter.

Fluidized bed reactors, in general, are well-known, and have been described in the prior art. Generally speaking they are effective means for carrying out chemical reactions such as the oxidation of industrial or municipal wet sludges, but such installations are quite large and relatively expensive to operate. The present invention, by virtue of operating at high pressures, reduces the size of the vessels used for the fluidized bed operation, and at the same time, unexpectedly, provides a source of hot, high-pressure gas which can be used to drive a turbine and generate electricity and other useful work, thereby materially reducing the cost of operation of the unit of the present invention as compared to a prior art unit.

The apparatus of the present invention is designed to be operated at high pressures compared to the pressures used in the prior art. Although the prior art suggests the use of pressures which are slightly above atmospheric, such as up to 15 psi, it is contemplated that the present invention will be operated at pressures in excess of 30 psig, with pressures of from about 50 to 100 psig being preferred.

In the operation of the preferred embodiment of apparatus of the present invention, moist raw sludge or other suitable combustible feed is fed to a bed of hot inert granular material maintained in a state of fluidization, whereby combustion of the sludge is effected. The hot granular material is maintained in a fluidized bed by the use of an oxygen containing gas, such as air, pure oxygen or a mixture thereof. The combustion thus reduces the organic solids in the sludge to a stable gaseous mixture, and a portion of the heat of combustion is used to flash off the moisture from the sludge feed. The balance heat from the combustion largely increases the temperature of the gases emerging from the fluidized bed.

The high temperature high pressure combustion gas products are available to drive a turbo expander which may be coupled to an electric generator or pump or other means to produce useful work. However, in order to protect the turbo expander, it is necessary to remove from the hot combustion gases all solid particles which are abrasive or which might tend to damage the turbo expander. This may be accomplished by inserting a particulate removal means, such as a cyclone, in the high pressure combustion gas line between the combustion chamber and the turbo expander. Although other types of solids removal apparatus such as Cottrell precipitators may be used, cyclones are commonly available dry, inertial separators, and are well adapted to remove particulate matter from gas. The particulate removal means may be located within the reaction chamber, as shown in FIg. 1, or may be external to the reaction chamber as is shown in FIG. 2.

The invention will be better understood by reference to the drawings in which:

FIG. 1 is an elevational view, partially in section, illustrating apparatus of the present invention with the particulate removal means within the reaction chamber; and FIG. 2 is an elevational view, partially in section, illustrating apparatus of the present invention wherein the particulate removal means is external to the reaction chamber.

In the drawings, the same reference numeral has been used on corresponding parts in both drawings in order to simplify comparison of both embodiments.

With reference to both FIGS. 1 and 2 there is shown a single fluidized bed reactor which comprises the main reaction vessel 10 which has auxiliary equipment associated therewith including a fluidizing-oxidizing gas supply tank 30, a fluidizing-oxidizing gas pump 32 and a fluidizing-oxidizing gas preheater 34. Included in the auxiliary equipment is a particulate matter separator means shown generally at 40 and a turbo expander 50 which is mechanically connected to an electrical generator 60.

The reactor itself, as is shown in FIGS. 1 and 2 is in a nature of a cylindrical steel vessel or vertical shell 10 which has a flat bottom 11. The whole vessel is provided with a lining 12 of a suitable refractory material. A constriction plate 13, divides the high pressure vessel or reactor into a wind box 14, below the constriction plate 13, and a reaction chamber 15, above the constriction plate. All of the fluidizing gases are supplied to the reactor 10 via wind box 14. The combustion of the moist organic sludge or such other reactions are carried out in the reaction chamber 15.

The constriction plate 13 may be of monolithic construction or it may be composed of shaped refractory bricks constituting a self-sustaining arch construction defined by a flat top and concave bottom. Alternatively, the constriction plate may comprise a metal base with a refractory top or cover. Similarly a metal base constriction plate may be used with a layer of non-fluidized sand on top to protect it from heat degradation. Holes 16 are regularly spaced throughout the constriction plate 13 in order to insure an even distribution of the fluidizing gases from the wind box 14 over the entire cross-section of the reaction chamber 15. Cap devices 17 are associated with a respective passages or holes 16 in the constriction plate to prevent the escape of the inert granular material from the reaction chamber 15 down through the constriction plate 13 into wind box 14.

In accordance with the present invention, the reaction chamber contains a more or less permanent charge or body of inert granular material having heat storing and heat radiating capability. Sand, shown generally at 18, may be employed for this purpose. The inert granular material must be graded to suit the requirements of the fluidizing operation. The sand 18 shown in FIGS. 1 and 2 is shown at rest. When sand 18 is in the fluidized state, the volume expands approximately 1.5 times into reaction chamber 15.

The reactor also includes means to feed wet sludge to the fluidized bed. As is shown in the drawings, the wet sludge feed means is located above the sand 18, when the sand is at rest, but when the sand is in the fluidized state, the wet sludge feed is supplied directly into the fluidized bed. The reactor also includes an auxiliary fuel supply for introducing auxiliary fuel to the wind box and/or the reactor chamber, but as shown in the drawings, the auxiliary fuel is preferably supplied to the fluidized bed. Although it is not shown in the drawings, the reactor also includes means to remove the ashes or periodically clean the inert granular material in the fluidized bed. The wind box may be equipped with an auxiliary fuel burner, not shown, which may be operated for starting up the sludge combustion operation. The auxiliary fuel burner may be adapted to burn either liquid, gas or solid fuel.

The combustion or other reaction gases leave the reaction chamber 15 through exhaust port or conduit 42 into particulate removal means 40. In the embodiment illustrated by FIG. 1, wherein the particulate removal means is within the reactor, it may conveniently be a cyclone of conventional design. In the embodiment illustrated by FIG. 2, wherein the particulate removal means is exterior to the reactor, it may be necessary to use a cyclone of reinforced design and construction in order to withstand the high pressures being employed. The particulate matter suspended in combustion gases is removed by the particulate remover 40 and the particles so removed are returned to the fluid bed via return conduit 44. The combustion gas, free of the particulate matter, moves through high pressure pipe 46 to the turbo expander 50. The hot, high pressure gases in high pressure pipe 46 cause the turbine to rotate, and while passing through the turbine, the pressure and temperature of the gases decrease. The gas leaving the turbo expander 50 is discharged through low pressure pipe 48. The turbo expander 50 is mechanically linked to a generator, shown schematically at 60, or to other mechanical apparatus capable of producing useful work. For instance, in lieu of a generator 60, the turbo expander may be linked to a pump to compress air or the like.

FIGS. 1 and 2 show diagrammatically a cryogenic tank 30 for storing liquid oxygen. While it will be obvious to those skilled in the art that cryogenic tanks need not be used, it is generally desirable if liquid oxygen is to be employed. Alternatively, compressed air can be used as the source of oxygen for the fluidized bed, or mixtures of air and liquid oxygen in any ratio may be used. The oxygen containing gas, is pumped, via pump 32 through preheater 34 where it is heated and then into the wind box 14. As is shown in FIG. 1, when the oxygen containing gas is liquid oxygen it is preferred to put the liquid oxygen through a vaporizer 36 which serves to heat and expand the liquid oxygen. The vaporizer and the preheater may be heated with low pressure combustion gases emerging from pipe 48, or a portion of the high-pressure combustion gases from pipe 46 may be used. Similarly, the preheater can be independently heated with a fuel and oxidizing gas.

It is contemplated that the apparatus of the present invention may be operated at pressures between 50 and 100 psig. By employing such pressures in the fluidized bed 15, it is possible to transmit to turbo expander 50, hot gases at temperatures between 1200° and 1600°F. and at pressures between 40 and 90 psig. Discharge from the turbo expander, referred to as the low pressure line 48, contains gases still at temperatures of 800° to 1000°F. and at pressures of 15 to 40 psig. As was mentioned above, the gases discharged from the turbo expander 50 in low pressure line 48, may be advantageous used in the preheater 34 and the vaporizer 36.

The apparatus of the present invention is operated as follows: using an auxiliary burner, not shown, the inert granular material is brought up to the required operating temperature. This is accomplished by burning fuel through the auxiliary burner with either air or oxygen which is brought into the wind box 14 through preheater 34. The fuel is ignited in the wind box 14 and the resulting combustion gases rise through the constriction plate openings 16, and heat the granular material 18. Thus, during the preparation of the fluidized bed, the wind box 14 becomes a combustion chamber. Sufficient pressure must be maintained in the wind box 14 to force the resulting hot combustion gases through the constriction plate 13 via holes 16 through the cap devices into the sand. The combustion gases must be sufficient in volume to maintain the sand 18 as an expanded fluidized bed, while at the same time heating the sand to the desired temperature. The spent heating and fluidized gases escape through the particulate recovery device 40, and are thence vented and allowed to escape or used as a source of heat in preheater 34. Alternatively, some or all of the auxiliary fuel may be injected directly into the fluidized bed where it may be burned with the oxygen containing gases coming up through the constriction plate 13.

Once the fluidized bed has reached the desired operating temperature, the prepared moist sludge feed is fed into the bed of hot turbulent sand particles. Although the feed may be inserted through the top of the reaction chamber 15, it is generally preferred that the feed be introduced into the middle of the fluidized bed, as is shown in the drawings. When the sludge combustion has reached a sufficient level, the venting of pipe 46 may be terminated and the high pressure combustion gases fed into the turbo expander.

The present invention contemplates the use of other types of fluidized bed reactors, so long as they are adapted to be operated at elevated pressures and temperatures and can be equipped with a turbo expander. For instance U.S. Pat. Nos. 2,980,515; 3,250,521 and 3,309,784 describe fluidized bed reactors which do not employ a constriction plate per se, but employ manifold-type devices to distribute the fluidizing gases. Such devices may be used in connection with the present invention.

The present invention contemplates various types of reactions being carried out within the apparatus. While combustion type reactions, wherein heat is generated and the products have a larger volume than the input materials, are generally preferred, since such reactions have a greater capacity to drive the turbo expander, other exothermic processes may be carried out in the apparatus of the present invention. Further, endothermic reactions and reactions in which the output gases have a smaller volume than the input gases may be carried out in the apparatus of the present invention, but the amount of useful work produced by the turbo expander will be correspondingly reduced.

The fluidizing gas, in the case of non-combustion processes, need not contain oxygen. In such cases, the feed material may be a convenient source of fluidizing gas.

The exhaust gas which exit from the reaction chamber is sometimes herein referred to as combustion gas. Those skilled in the art will be aware that reactions which do not involve combustion will produce exhaust gases of varying character, the nature of which depends upon the reaction. The term "combustion gases" as used herein generally defines the gaseous products resulting from the combustion of organic matter. These gases will therefore generally comprise carbon dioxide, nitrogen, oxygen and water vapor along with minor concentrations of other inert gases. Other gases may be present such as sulfur dioxide, if paper mill wastes are reacted for instance. If the main oxygen containing gas is air, the nitrogen content of the combustion gases will be quite large. Those skilled in the art will be aware that if the oxygen containing gas is air, combustion gases emerging from the combustion chamber will be larger in volume but lower in temperature than is the case when liquid oxygen is the oxygen containing gas. On the other hand, if oxygen is the sole oxygen containing gas, the nitrogen content of the combustion gases will be relatively low. In this case the combustion gas temperatures will be higher, but the volume and pressure of the combustion gases will be somewhat lower.

As those skilled in the art will know, the higher combustion temperatures achieved by the use of liquid oxygen are desirable in the disposal of some types of waste material.

The forms of invention herein shown and described are to be considered only as illustrative. It will be apparent to those skilled in the art that numerous modifications may be made therein without departure from the spirit of the invention or the scope of the appended claims.

I claim:

1. Apparatus comprising:
   a combustion vessel adapted to operate at pressures exceeding 15 psig and temperatures exceeding 1200°F.;
   a body of inert granular material adapted to be fluidized and maintained in vessel;
   a feed means for supplying a high moisture waste containing combustible organic waste matter to the vessel under pressure at a controllable rate;
   a gas supply means for supplying oxygen containing gas to said vessel for fluidizing said granular material in said vessel;
   a gas exhaust means for exhausting gas under pressure from said vessel;
   a turbo expander in fluid communication with said exhaust means, whereby said exhaust gas drives said turbo expander; and
   means in operable communication with the turbo expander to be driven thereby.

2. An apparatus as described in claim 1, which includes a particulate removal means associated with said gas exhaust means, adapted to remove entrained solid particles from said exhaust gas.

3. An apparatus as described in claim 1 wherein said turbo expander is in communication with an electrical generator.

4. An apparatus for the disposal of high moisture waste, wherein a major portion of the solids thereof comprise combustible organic waste matter, which comprises:
   a combustion unit for the combustion of said high moisture waste, said combustion unit being a pressure vessel adapted to operate at pressures exceeding 15 psig and temperatures exceeding 1200°F.;
   a transverse constriction plate horizontally dividing said combustion unit into a wind box below and a combustion chamber above said plate;
   a body of inert granular material adapted to be fluidized and maintained in said combustion chamber, said material having heat-storing and heat radiating capability;
   a feed means for supplying said high moisture waste to said combustion chamber under pressure at a controllable rate;
   a gas supply means for supplying an oxygen containing gas to said wind box under pressure for fluidizing said granular material in said combustion chamber and for the combustion of said high moisture waste;
   gas exhaust means for exhausting the resulting combustion gases under pressure from said combustion chamber;
   particulate removal means associated with said gas exhaust means, adapted to remove entrained solid particles from said combustion gases; and
   a turbo expander associated with the gaseous output of said particulate removal means whereby said combustion gases drive said turbo expander to produce useful work.

5. The apparatus, as described in claim 4, wherein said combustion unit is provided with auxiliary fuel supply means for supplying auxiliary fuel under pressure to said combustion chamber.

6. The apparatus, as described in claim 4 wherein said gas supply means includes gas preheater for raising the temperatures of said oxygen containing gas under pressure prior to said gas entering said wind-box.

7. The apparatus described in claim 6, wherein the exhaust gases from said turbo expander are used to raise the temperature of the oxygen containing gas in said preheater.

8. The apparatus, as described in claim 4, wherein said particulate removal means is disposed within said combustion chamber.

9. The apparatus, as described in claim 4, wherein said particulate removal means is positioned exterior to said combustion unit.

10. The apparatus as described in claim 4 wherein said turbo expander is mechanically connected to an electrical generator.

11. A method of incinerating high moisture waste, wherein a major portion of the solids thereof comprise combustible organic waste matter, which comprises maintaining a high pressure fluidized bed of inert granular material at a temperature of at least 1200°F., wherein said inert granular material is fluidized with an oxygen containing gas under pressure of at least 30 psig, feeding said high moisture waste under pressure into said high pressure high temperature fluidized bed whereby said waste is burned with said oxygen containing gas and said moisture is volatilized, removing solid particles entrained in the resulting high temperature, high pressure combustion gas, and feeding said combustion gas to a turbo expander which produces useful work therefrom.

12. A method as described in claim 11, wherein said oxygen containing gas is preheated prior to entering said fluidized bed.

13. A method as described in claim 11 wherein the exhaust from said turbo expander is used to preheat said oxygen containing gas.

* * * * *